(12) United States Patent
Driesch, Jr. et al.

(10) Patent No.: US 6,938,035 B2
(45) Date of Patent: Aug. 30, 2005

(54) REDUCE DATABASE MONITOR WORKLOAD BY EMPLOYING PREDICTIVE QUERY THRESHOLD

(75) Inventors: Robert Douglas Driesch, Jr., Lakeville, MN (US); Thomas J. Schreiber, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 321 days.

(21) Appl. No.: 09/970,352

(22) Filed: Oct. 3, 2001

(65) Prior Publication Data

US 2003/0065648 A1 Apr. 3, 2003

(51) Int. Cl.[7] ............................................. G06F 17/30
(52) U.S. Cl. ................................................. 707/3; 707/2
(58) Field of Search .......................................... 707/2, 3

(56) References Cited

U.S. PATENT DOCUMENTS 6,353,818 B1 * 3/2002 Carino, Jr. ..................... 707/2
6,529,901 B1 * 3/2003 Chaudhuri et al. ............. 707/3
6,640,218 B1 * 10/2003 Golding et al. ................. 707/2

* cited by examiner

Primary Examiner—Charles Rones
(74) Attorney, Agent, or Firm—Moser, Patterson & Sheridan, LLP

(57) ABSTRACT

Methods, systems and articles of manufacture for selectively maintaining query implementation information. A user is able to set a Predictive Query Threshold which will be honored by a database system to determine for which queries information will be collected. In one embodiment, the decision about whether to collect information for a query is made before the query starts to run (i.e., before the plan is executed) by comparing the Predictive Query Threshold to some cost factor (e.g. estimated runtime). In another embodiment, each query may be monitored but the query implementation information is only selectively logged. Specifically, the determination as to whether query implementation information for a query should be logged is made after the query implementation information is collected.

29 Claims, 3 Drawing Sheets

US 6,938,035 B2

REDUCE DATABASE MONITOR WORKLOAD BY EMPLOYING PREDICTIVE QUERY THRESHOLD

BACKGROUND OF THE INVENTION

1. Field of the Invention

Embodiments of the present invention relate to databases. More specifically embodiments relate to selectively logging query implementation information.

2. Background of the Related Art

Databases are computerized information storage and retrieval systems. A relational database management system (RDBMS) is a computer database management system that uses relational techniques for storing and retrieving data. Relational databases are computerized information storage and retrieval systems in which data in the form of tables (formally denominated "relations") are typically stored for use on disk drives or similar mass data stores. A "table" includes a set of rows (formally denominated "tuples" or "records") spanning several columns (formally denominated "attributes"). Reference is made to C. J. Date, *An Introduction to Database Systems*, 6th edition, Addison-Wesley Publishing Co. Reading, Mass. (1994) for an comprehensive general treatment of the relational database art.

An RDBMS is structured to accept commands to store, retrieve and delete data using, for example, high-level query languages such as the Structured Query Language (SQL). The term "query" denominates a set of commands for retrieving data from a stored database. These queries may come from users, application programs, or remote systems (clients or peers). The query language requires the return of a particular data set in response to a particular query but the method of query execution ("Query Execution Plan") employed by the RDBMS is not specified by the query. The method of query execution is typically called an execution plan, an access plan, or just "plan". There are typically many different useful execution plans for any particular query, each of which returns the required data set. For large databases, the execution plan selected by the RDBMS to execute a query must provide the required data at a reasonable cost in time and hardware resources. In general, the overall optimization process includes four broad stages. These are (1) casting the user query into some internal representation, (2) converting to canonical form, (3) choosing prospective implementation procedures, and (4) generating executable plans and choosing the cheapest of said plans.

To successfully implement an application that invokes queries, the RDBMS must provide a process to track or capture the database activity that is taking place within the system. Such processes are known in the art as "monitors". Monitors can include, but are not limited to, the execution of queries against the database. All of the information captured from these monitors can be stored in either a log file or in another storage medium that will allow for easy access to the data to perform any analysis. The results of these monitors can be analyzed to determine if the system is operating in an optimal manner. Queries that are not making the best use of the system resources can be identified for further analysis or tuning.

Monitors can capture their information in many ways. For example, the monitor may capture the information while the query is active (called runtime monitoring) or may perform its capture from a separate process and extract the information about a query from its execution plan. Both of these methods require that the system expend resources formulating the information into a form that can be easily extracted and stored within the monitors. On a system with a large database with frequent database access, these resources can be excessive and degrade the overall performance of the system.

A primary problem associated with the use of monitors is the need to balance the amount of information collected against the resources required to formulate the data into a usable form. In addition to the resources utilized in collecting the monitor information, the sheer volume of information collected can make analysis difficult and time consuming. Various solutions have been made to lessen the impact that monitors have on the overall system throughput. For example, the level of detail of stored information can be adjusted to control the amount of resources that are expended to formulate and store the records that describe the individual query. Another attempt to mitigate the impact of monitors includes adjusting control of duplicate records about an identical query to prevent information about each occurrence of the query from being added to the log file. Further, the storage medium or system itself can be manipulated to optimize access to the log file to take advantage of any inherit strengths of the I/O system to speed writes into the log file.

However, in each of these attempts the RDBMS is still responsible for formulating and writing the data to the monitor for queries which a user has no intention of performing any analysis upon. These "noise-level" queries, which are in essence queries that fall within a tolerance range of acceptable performance, can easily over-populate the log file and make any attempt to perform analysis of the results difficult and time consuming. Accordingly, some way is needed to filter out these noise-level queries without requiring the RDBMS to expend any resources to prepare the information for the monitor.

Therefore, there is a need for methods and systems configured to reduce the overhead associated with maintaining log information for queries in a database environment.

SUMMARY OF THE INVENTION

Methods, systems and articles of manufacture are provided for selectively logging monitor information. In one embodiment, a method is provided of selectively logging monitor information (i.e., input/output (I/O) activity and plan information) of a query in a database management system. The method comprises determining an execution plan for a received query; determining whether monitor information should be logged/collected for the query; and executing the query.

Another embodiment provides a computer readable medium containing a program which, when executed by a computer, performs an operation of selectively logging monitor information of a query in a database management system. The operation comprises determining an execution plan for a query; and determining, according to at least one threshold value, whether monitor information should be logged for the query. In one embodiment, determining whether monitor information should be logged comprises comparing the at least one threshold value to a cost factor, such as an estimated runtime for the query. If the cost factor exceeds the threshold value, the I/O activity information is logged.

In yet another embodiment, a database system comprises at least one database; a query processor to generate execution plans for queries requesting information contained in the database; a database engine to access the database according to the execution plans; a threshold data structure containing at least one threshold value; and a monitor information log. Monitor information for the query is written to the log only if the threshold value is exceeded by a selected cost factor of the query.

BRIEF DESCRIPTION OF THE DRAWINGS

So that the manner in which the above recited features and embodiments are attained and can be understood in detail, a more particular description of embodiments of the invention, briefly summarized above, may be had by reference to the embodiments described below and which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
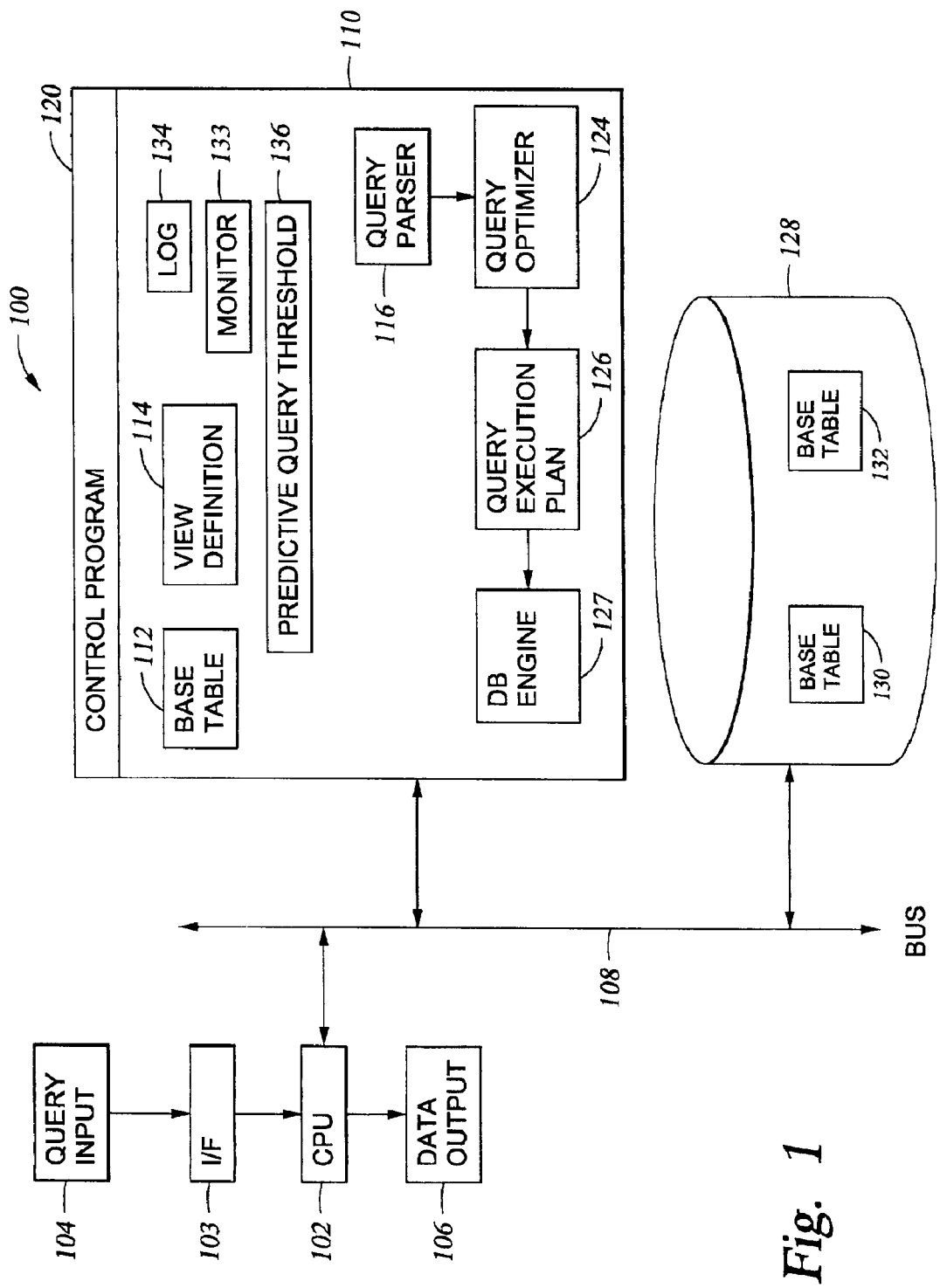
FIG. 1 shows a high level diagram of a database management system.

Methods, systems and articles of manufacture are provided for selectively maintaining query implementation information. A user is able to set a Predictive Query Threshold which will be honored by a database system to determine for which queries query implementation information will be collected. In one embodiment, the decision about whether to collect information for a query is made before the query starts to run (i.e., before the plan is executed) by comparing the Predictive Query Threshold to some pre-runtime cost factor (e.g. estimated runtime). If a decision is made not to collect the information, a monitor process need not be initiated for the query. In this manner, the query engine need not collect and process query implementation information for queries which are already performing up to a user's expectations. In another embodiment, each query may be monitored but the determination as to whether query implementation information for a query should be logged is made after the query implementation information is collected. This determination may be made by comparing the Predictive Query Threshold to some post-runtime cost factor (e.g., the actual execution time of the query).

In some cases it may be desirable to log only selective portions of the query implementation information. In such cases, a Predictive Query Threshold may be utilized to determine which portion of the query implementation information will be stored.

In one aspect, a monitor is allowed to collect the query implementation information while the respective query is active without affecting the overall performance for the system or application. This approach is particularly advantageous in a database server environment where the application requires that a monitor be active at all times (e.g., in the case of SAP).

While the embodiments hereinafter will be described in the context of fully functioning computers and computer systems, those skilled in the art will appreciate that the various embodiments of the invention are capable of being distributed as a program product in a variety of forms, and that embodiments of the invention apply equally regardless of the particular type of signal bearing media used to actually carry out the distribution. In one embodiment, a signal bearing medium contains a program which, when executed by a processor, performs an optimization method. Examples of signal bearing media include, but are not limited to, recordable type media such as volatile and nonvolatile memory devices, floppy and other removable disks, hard disk drives, optical disks (e.g., CD-ROMs, DVDs, etc.), and transmission type media such as digital and analog communication links. Transmission type media include information conveyed to a computer by a communications medium, such as through a computer or telephone network, and includes wireless communications. The latter embodiment specifically includes information downloaded from the Internet and other networks. Such signal-bearing media, when carrying computer-readable instructions that direct the functions of the present invention, represent embodiments of the present invention.

FIG. 1 shows a functional block diagram of a computer-implemented database processing system 100 suitable for practicing the procedure of this invention. This exemplary configuration is described for illustrative purposes only and it should be appreciated that other embodiments are possible. System 100 includes a central processing unit (CPU) 102, which is coupled to a bus 108. A query input terminal 104 allows the user to enter queries into system 100, either from a remote terminal or through any other useful method known in the art.

In one embodiment, query input terminal 104 may communicate with the CPU 102 via a standard operator terminal interface 103, such as one of the interfaces known as IMS/DB/DC, CICS, TSO, OS/2. More generally, the interface 103 may be any entry/exit component configured to transmit electrical signals to and from the CPU and that represent commands for performing various search and retrieval functions against a database 128.

In one embodiment, the input queries conform to the SQL standard interface, and invoke functions performed by RDBMS software. Illustratively, the RDBMS software comprises the "DB2" product offered by the IBM Corporation for the "MVS", "AIX", or "OS/2" operating systems. Such software generally resides in computer memory. Those skilled in the art will recognize that the present invention has application to any RDBMS software that uses SQL, and may similarly be applied to non-SQL queries.

As used herein, a "query" includes a combination of SQL commands intended to produce one or more output data tables according to a specification included in the query. The data output terminal 106 displays the query results to the user and may be physically co-located with query input terminal 104.

System 100 includes the address space 110, which is shown schematically as containing program objects and data objects. The base table 112 is an example of a data object pulled into address space 110 from the database 128 by way of bus 108. The view definition 114 is another data object representing a "virtual table" made up of elements from one or more base tables in accordance with a VIEW definition statement. Database 128 includes a generally large plurality of base tables, exemplified by base tables 130 and 132. These base tables are moved partially or entirely between memory space 110 and database 128 in a manner well-known in the art for database management systems.

The address space 110 also includes a monitor routine 133, an I/O log 134 and a predictive query threshold 136.

The monitor routine 133, when executed for a particular query, collects query implementation information (i.e., I/O activity information and plan information) for the query. The query implementation information may then be written to the log 134. The log 134 may be a base table or some allocated portion of the address space 110. The log 134 may later be accessed to retrieve query implementation information for purposes of, for example, determining system efficiency. In the present embodiments, the log 134 is selectively written to depending on whether one or more cost factors exceed the predictive query threshold 136. In general, the threshold 136 may be any user-specified value such as a time value, for example.

Address space 110 also includes the control program object 120, which manages the other components of system 100. Illustratively, these components include a query parser 116 for accepting the query input from terminal 104.

The query processor component (i.e., the parser 116) of the RDBMS will respond to submission of a user query by providing the optimizer 124 with parsed code that permits selecting from multiple execution plans. The query optimizer 124 is configured to select the manner in which queries will be processed. The primary task of the optimizer 124 is to determine the cheapest (i.e., most efficient) way to execute each particular query request against a database. To this end, the optimizer 124 chooses one execution plan from a group of plans. The execution plan contains (in a proprietary form unique to the RDBMS) low-level information indicating precisely what steps the system is to take to execute the query.

For any given query, there are any number of possible "plans" that could be chosen. Thus, the optimizer 124 must select the best one for each query it encounters. In doing so, the optimizer 124 must compare the costs of competing plans in order to pick the "best" one. The costs may be estimated resource requirements determined in terms of time and space. More specifically, the resource requirements may include system information such as the location of tables and parts of tables, the size of such tables, network node locations, system operating characteristics and statistics, estimated runtime for a query, space usage and the like.

Accordingly, after query optimizer 124 receives the parsed statement from the parser 116, a generally large number of useful plans are generated and tested for "cost" in accordance with a predetermined cost formula. After identifying an "optimal" query execution plan, optimizer 124 produces this plan as a program object, depicted as query execution plan 126 in address space 110. Plan 126 is finally executed with the database engine 127 and the resulting table is forwarded to data output of display 106 upon completion.

In addition, steps are taken to determine whether or not log information for the various queries will be collected. Specifically, the user-supplied predictive query threshold is utilized and compared to one or more cost factors (i.e., factors used in determining the optimal execution plan). One illustrative cost factor is an estimated runtime for a particular query. In one embodiment, the determination of whether or not to collect log information comprises determining whether to initiate a monitor process for a particular query at all. In this case, the determination is made prior to execution of the selected execution plan. In another embodiment, the determination is made subsequent to execution. In this case, query implementation information is collected for each query and, after the plan for the query has been executed, a determination is made as to whether the execution time for the plan exceeds the predictive query threshold. If the predictive query threshold is exceeded, the query implementation information is logged. Otherwise, the query implementation information is not logged.

Figure 2:
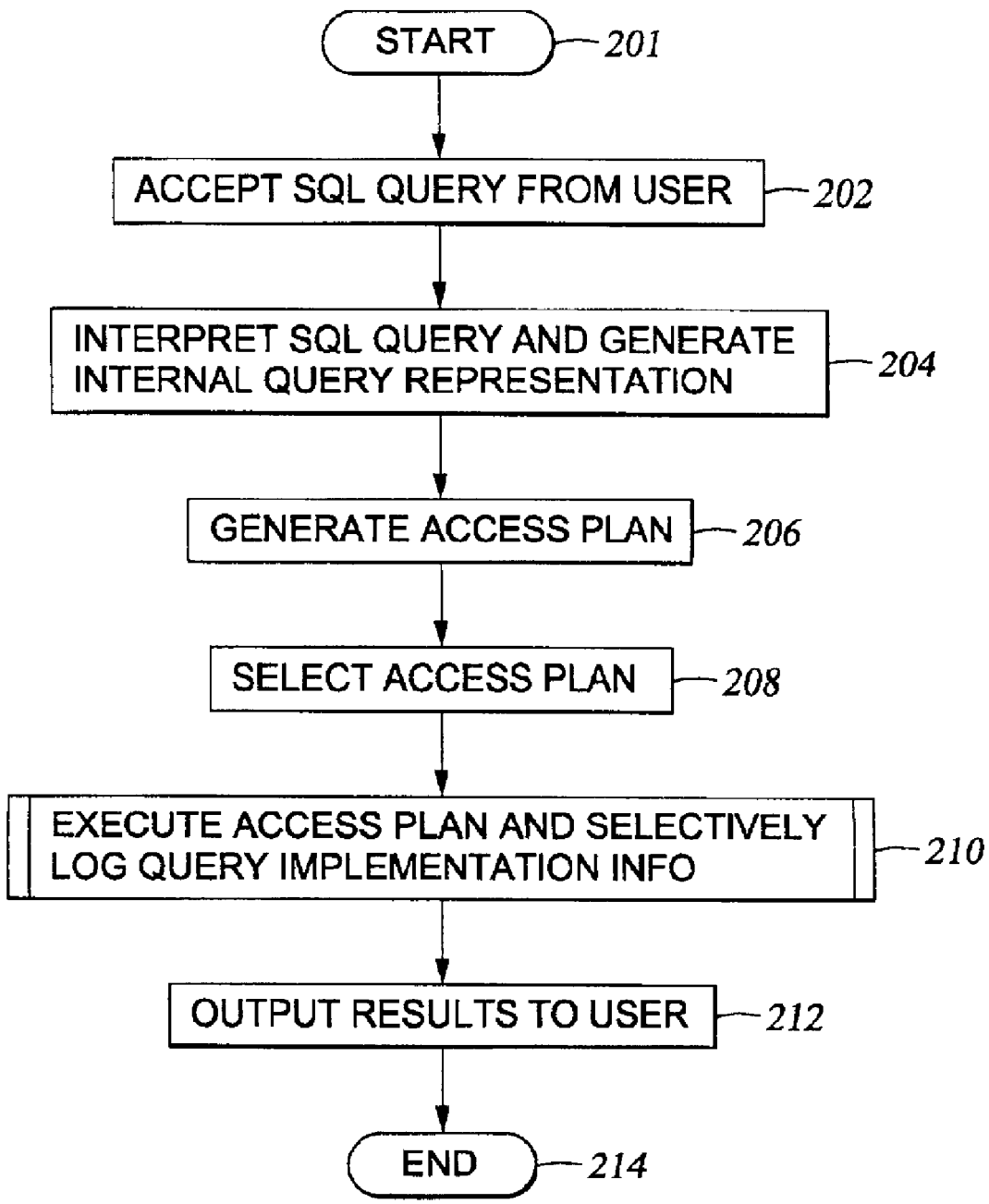
FIG. 2 shows a flow chart illustrating plan generation and execution.

FIG. 2 shows a method 200 of optimizing and executing a query while selectively collecting log information. Illustratively, these steps are implemented as computer program steps stored in the system 100. The method 200 is entered at step 201 and proceeds to 202. Step 202 represents the input of an SQL statement into the computer system 100 from the user. Generally, the SQL statements received as input from the user specify the data the user wants, in the form of a query, but do not specify how to get it. At step 204 the received SQL statement is compiled or interpreted. Step 206 represents generating a compiled set of runtime structures, called an "access plan" or "execution plan", from the compiled SQL statements. The access plan represents the computer-generated sequence of operations to obtain the data specified by the user query. Generation of the access plan involves consideration of both the available access paths (indexes, sequential reads, etc.) and system held statistics on the data to be accessed (the size of the table, the number of distinct values in a particular column, etc.), to choose what the RDBMS processor considers to be the most efficient access plan for the query. The execution cost of the plans are compared until either no alternatives remain or a time limit expires. Selection of a plan is preferably performed by the optimizer 124 at step 208 according to a predetermined cost formula. The selection of the most efficient access plan utilizes query, database, and system information that is available to the optimizer 124. Such information may include any variety of cost factors such as access paths, system held statistics, estimated runtime, system resources, system usage, etc. The selected plan is then executed at step 210 and the results of the execution are output to the user at step 212. Step 210 also includes selectively monitoring the query. A particular embodiment of step 210 is described below with reference to FIG. 3. The method 200 is exited at step 214.

Figure 3:
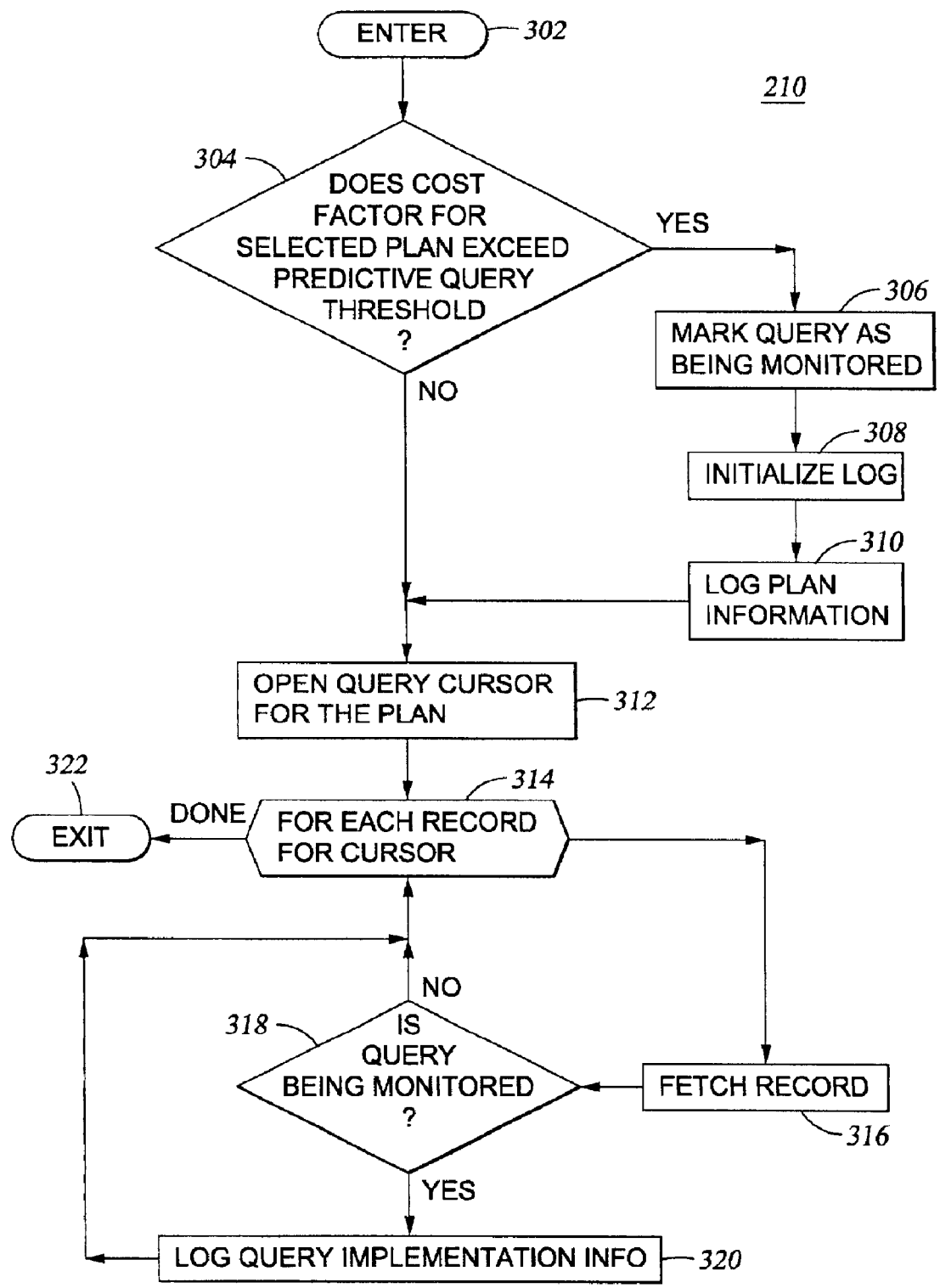
FIG. 3 shows a flow chart illustrating selective monitoring of queries.

FIG. 3 shows one embodiment of step 210 for executing a query according to a selected execution plan and determining whether query implementation information will be collected/logged. The method 210 is entered at step 302 and then proceeds to step 304 where the predictive query threshold 136 is compared to a cost factor. Illustratively, the cost factor is the estimated execution time for the selected plan; however, the comparison at step 304 may be made with respect to other cost factors, as described above. Further, step 304 may involve a comparison between any number of predictive query thresholds and cost factors. For example, two separate cost factors for the query may be compared to two separate predictive query thresholds. In any case, if step 304 is answered negatively (i.e., the cost factor(s) does not exceed the predictive query threshold(s)), processing continues to step 312. Alternatively, if step 304 is answered affirmatively (i.e., the cost factor(s) exceeds the predictive query threshold(s)), processing continues to step 306.

At step 306, the query is marked for monitoring. That is, some indication that the query will be monitored is made. In one embodiment, for example, a flag may be set for the query. At step 308, the log 134 is initialized. The plan information generated at step 206 (described above with reference to FIG. 2) is then written to the log 134 at step 310. Processing then proceeds to step 312.

At step 312, a query cursor for the selected plan is opened in preparation to execute the plan. A loop is then entered at step 314 for each record for the cursor. At a first step of the loop, represented by step 316, a record for the cursor is fetched. At step 318, the method 210 determines whether the query for which the record is fetched is being monitored. This determination is made according to the implementation of step 306 described above. For example, if a flag value was set, then a flag value is checked at step 318. If the query is not being monitored, the method 210 returns to step 314 to begin processing for the next record. If, however, the query is being monitored, then the I/O activity for the query is logged at step 320. Processing then returns to step 314. Once all of the records for the cursor have been fetched (i.e., the query has been executed), the method 210 exits at step 322.

It should be noted that in the embodiment described with reference to FIG. 3, a determination is first made as to whether a query should be monitored at all. However, as noted above, it is also contemplated that each query be monitored but that the respective query implementation information be selectively logged. In such an embodiment, step 306 is eliminated and step 318 is replaced with the processing of step 304. Further, the cost factor compared to the threshold value is a post-runtime cost factor, such as the actual runtime for the query.

While the foregoing is directed to the preferred embodiments of the present invention, other and further embodiments of the invention may be devised without departing from the basic scope thereof, and the scope thereof is determined by the claims that follow.

What is claimed is:

1. A computer readable medium containing a program which, when executed by a computer, performs an operation of selectively logging query implementation information of a query in a database management system, the operation comprising:

determining an execution plan for a query; and before executing the query, determining, on the basis of at least one threshold value and the execution plan, whether query implementation information should be logged for the query, wherein the query implementation information characterizes usage of system resources needed to execute the query.

2. A computer readable medium containing a program which, when executed by a computer, performs an operation of selectively logging query implementation information of a query in a database management system, the operation comprising:

determining an execution plan for a query for which query implementation information is generated during execution of the query, wherein the query implementation information characterizes usage of system resources needed to execute the query; and after executing the query, determining whether the query implementation information should be logged for the query; wherein determining whether the query implementation information should be logged comprises determining whether a post-runtime cost factor exceeds a predefined threshold value.

3. A method of selectively logging query implementation information of a query in a database management system, the method comprising:

receiving a query;

determining an execution plan for the query;

executing the query; and after executing the query, determining whether query implementation information should be logged for the query, wherein the query implementation information characterizes usage of system resources needed to execute the query according to the execution plan.

4. The method of claim 3, wherein the query implementation information is generated by a monitor.

5. The method of claim 4, wherein determining whether the query implementation information should be logged comprises determining whether a post-runtime cost factor exceeds a predefined threshold value.

6. A method of selectively logging query implementation information of a query in a database management system, the method comprising:

receiving a query;

determining an execution plan for the query;

determining, on the basis of the execution plan, whether query implementation information should be logged for the query, wherein the query implementation information characterizes usage of system resources needed to execute the query according to the execution plan; and executing the query after determining whether the query implementation information should be logged for the query.

7. The method of claim 1, wherein determining whether query implementation information should be logged comprises determining whether a monitoring process should be invoked to monitor the query;

wherein the monitoring process generates the implementation information.

8. The method of claim 1, wherein determining whether query implementation information should be logged comprises comparing an estimated runtime of the query to a user-specified threshold value.

9. The method of claim 1, wherein determining an execution plan comprises determining a cost for a plurality of execution plans using one or more cost factors end wherein determining whether query implementation information should be logged comprises comparing at least one of the cost factors to a user-specified threshold value.

10. The method of claim 1, wherein determining whether the query implementation information should be logged comprises comparing a cost factor of the execution plan to a predefined threshold value.

11. The method of claim 10, wherein the cost factor is selected from at least one of a location of tables, a size of tables, a network node location, a system operating characteristic, a system operating statistic, an estimated runtime for the query, space usage and any combination thereof.

12. The method of claim 1, wherein determining whether query implementation information should be logged is done on the basis of the execution plan.

13. The method of claim 1, wherein determining whether query implementation information should be logged comprises:

comparing a cost factor of the query to a threshold value; and if the cost factor exceeds the threshold value, then logging the query implementation information.

14. The method of claim 13, wherein the cost factor is an estimated runtime of the query.

15. The computer readable medium of claim 14, further comprising executing the query.

16. The computer readable medium of claim 15, wherein determining whether query implementation information should be logged for the query is done on the basis of the execution plan.

17. The computer readable medium of claim 14, wherein determining whether query implementation information should be logged comprises determining whether a monitoring process should be invoked to monitor the query; wherein the monitoring process generates the implementation information.

18. The computer readable medium of claim 14, wherein determining an execution plan comprises determining a cost for a plurality of execution plans using one or more cost factors and wherein determining whether query implementation information should be logged comprises comparing at least one of the cost factors to the at least one threshold value.

19. The computer readable medium of claim 14, wherein determining whether query implementation information should be logged comprises comparing a cost factor to the at least one threshold value.

20. The computer readable medium of claim 19, wherein the cost factor is an estimated runtime of the query.

21. The computer readable medium of claim 19, wherein the cost factor is selected from at least one of a location of tables, a size of tables, a network node location, a system operating characteristic, a system operating statistic, an estimated runtime for the query, space usage and any combination thereof.

22. The computer readable medium of claim 14, wherein determining whether query implementation information should be logged comprises:

comparing a cost factor of the query to the at least one threshold value; and if the cost factor exceeds the at least one threshold value, then logging the query implementation information.

23. The computer readable medium of claim 22, wherein the cost factor is an estimated runtime of the query.

24. A database system, comprising:

at least one database;

a query processor to generate execution plans for queries requesting information contained in the database;

a database engine to access the database according to the execution plans;

a threshold data structure containing at least one threshold value;

a query monitor configured to selectively generate query implementation information for at least some of the queries that are executed, wherein the query implementation information characterizes usage of system resources needed to execute the queries;

a query implementation information log for logging the query implementation information;

a threshold evaluator configured to determine whether the threshold value is exceeded by a selected cost factor of a given query; wherein the query implementation information for the given query is written to the query implementation information log only if the threshold value is exceeded by the selected cost factor of the query.

25. The database system of claim 24, wherein the selected cost factor is an estimated runtime of the query.

26. The database system of claim 24, wherein the cost factor is selected from at least one of a location of tables, a size of tables, a network node location, a system operating characteristic, a system operating statistic, an estimated runtime for the query, space usage and any combination thereof.

27. The database system of claim 24, further comprising a monitor program which, when executed, monitors the query to collect the query implementation information.

28. The database system of claim 27, wherein the monitor program is executed only if the threshold value is exceeded by the selected cost factor of the query.

29. The database system of claim 28, wherein the selected cost factor is an estimated runtime of the query.

* * * * *

UNITED STATES PATENT AND TRADEMARK OFFICE
CERTIFICATE OF CORRECTION

PATENT NO. : 6,938,035 B2
APPLICATION NO. : 09/970352
DATED : August 30, 2005
INVENTOR(S) : Driesch, Jr. et al.

It is certified that error appears in the above-identified patent and that said Letters Patent is hereby corrected as shown below:

In the Claims:

Column 8, Line 22, Claim 7, please delete "1" and insert -- 6 -- therefor;

Column 8, Line 28, Claim 8, please delete "1" and insert -- 6 -- therefor;

Column 8, Line 32, Claim 9, please delete "1" and insert -- 6 -- therefor;

Column 8, Line 38, Claim 10, please delete "1" and insert -- 6 -- therefor;

Column 8, Line 48, Claim 12, please delete "1" and insert -- 6 -- therefor;

Column 8, Line 51, Claim 13, please delete "1" and insert -- 6 -- therefor;

Column 8, Line 60, Claim 15, please delete "14" and insert -- 1 -- therefor;

Column 8, Line 66, Claim 17, please delete "14" and insert -- 1 -- therefor;

Column 9, Line 5, Claim 18, please delete "14" and insert -- 1 -- therefor;

Column 9, Line 12, Claim 19, please delete "14" and insert -- 1 -- therefor;

Column 9, Line 24, Claim 22, please delete "14" and insert -- 1 -- therefor.

Signed and Sealed this
Thirtieth Day of April, 2013

Teresa Stanek Rea
*Acting Director of the United States Patent and Trademark Office*